Patented Jan. 17, 1950

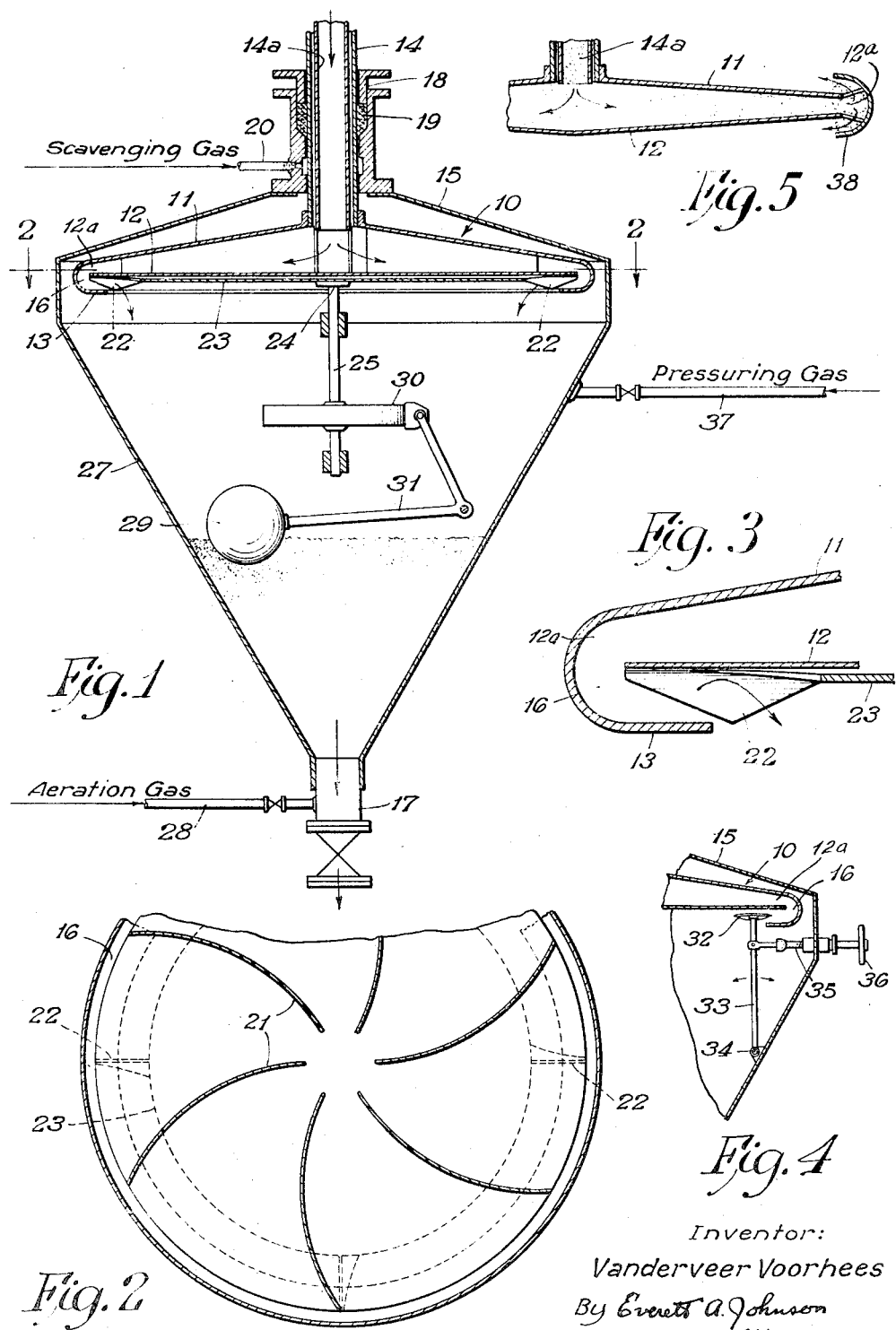

2,495,152

UNITED STATES PATENT OFFICE 2,495,152

METHOD AND MEANS FOR PRESSURING FLUIDIZED SOLIDS

Vanderveer Voorhees, Homewood, Ill., assignor to Standard Oil Company, Chicago, Ill., a corporation of Indiana Application May 29, 1945, Serial No. 596,583

16 Claims. (Cl. 302—36)

This invention relates to apparatus and method for transferring finely divided solids between zones of different pressures. More particularly the invention relates to a means for introducing finely divided solid catalyst materials into a conversion zone or conduit communicating therewith in which a gasiform fluid is maintained under a substantially higher pressure than that existing in the reservoir for the finely divided solids. Specifically, the invention relates to a centrifugal-type transfer mechanism which provides continuous introduction of finely divided solids into a contacting zone operating under pressure.

In powdered catalyst conversion systems, it is sometimes desirable to employ pressure of the order of between about 50 and about 200 p. s. i. or higher. In the recycling of regenerated catalyst this operating condition imposes no serious difficulty where the pressure between a reactor and a regenerator can be balanced and catalyst standpipes can be used for transferring the catalyst within the high pressure system. However, in order to operate the reactor and regenerator at different pressures or to supply fresh or make-up catalyst, a serious difficulty is encountered and a catalyst pump is desirable.

Various designs of pumps for handling abrasive solids of this sort have been proposed but are inadequate for one reason or another. One type of pump is a worm conveyor which is capable of introducing the finely divided solids into a higher pressure zone but this procedure involves a comparatively large consumption of power in compacting the material to the desired degree and the apparatus is subject to rapid wear by erosion. Centrifugal types of solids pumps generally suffer from the disadvantage of abrasion and of critical control.

It is an object of this invention to provide for the continuous transfer of a finely divided solid into a zone of higher pressure without pressure loss or blow back and also to avoid bridging or premature contacting of the solids in the vicinity of the point of introduction.

This and other objects will become apparent and the operation of my device will be more fully understood as the description thereof is developed in the following specification which is to be read in conjunction with the accompanying drawing.

Briefly, the objects of my invention are obtained by subjecting the finely divided solids, before they are contacted with the high pressure, gasiform fluids, to centrifugal action whereby with a low consumption of power and with much less wear of moving parts of the apparatus, the finely divided solids are compacted sufficiently to prevent the escape of the gasiform fluid under pressure in the reverse direction. The apparatus and method for transferring the finely divided solids is the subject matter of my invention. The system comprises a hollow rotatable chamber with means for introducing the finely divided solids to the central portion of the rotatable chamber. The means for introducing the finely divided solids may, for example, comprise a standpipe or catastat by which a pseudo-hydrostatic head is maintained by a column of solids. The term catastat as used in this specification defines a vertically elongated column within which is maintained a quantity of aerated solids which provides a pseudo-hydrostatic head which is a function of the height of the column. The solids delivered to the rotatable chamber are caused, by centrifugal force, to move toward the periphery of the rotatable chamber where the solids are accumulated in the annular trough by the centrifugal action and from which the solids are discharged into a chamber by means of a rotatable plow or scraper.

In the drawings:

Figure 1 is a vertical section of one embodiment of the apparatus;

Figure 2 is a view taken at 2—2 in Figure 1;

Figure 3 is an enlarged view showing the details of the centrifugal member and of the rotatable plow.

Figure 4 is a partial section of another modification of Figure 3 and

Figure 5 is a detail section of a modified feature of the apparatus.

Referring to the drawings, the rotatable chamber 10 may be formed of two members 11 and 12, the peripheral margins of the members being spaced to form a constricted peripheral opening 12a of the chamber. The upper member is of greater diameter than the lower and has a flange 13 which overlaps the periphery of the lower member 12. The chamber 10 is mounted on the rotatable hollow shaft 14 within the pump casing or housing 15. The shaft 14 and the chamber 10 are rotated at a suitable angular velocity (for example, by a pulley means not shown) to provide sufficient centrifugal force so that the pressure generated at the periphery of the discs 11 and 12 in trough 16 will be greater than the back pressure of the systems connected to the outlet 17 of the pump case. The rotatable chamber 10 can be provided with a plurality of deflector elements 21 which can be curved as illustrated to guide the solids to the peripheral deflector flange 13 and trough 16. Packing gland 18 and packing 19 are provided about the rotatable hollow shaft 14. Stationary feed pipe 14a serves to introduce the fluidized solids. A sealing or scavenging gas can be supplied under pressure by a line 20 to render the gland pressure-tight and prevent access of abrasive powder to the bearing.

The reversed flange 13 at the periphery of the upper disc 11 provides a trap space or trough 16 into which catalyst is forced in a substantially deaerated condition as a result of the pressure developed in the rotatable chamber 10. The finely divided solids will not flow from the trough or channel 16 until they are mechanically removed therefrom by means of skimmers or plows 22. These scrapers 22 are carried on spider or disc 23 which is coaxially pivoted at 24 on floating shaft 25. The plows 22 and spider 23 normally rotate with the chamber 10, but since the plows frictionally engage or are embedded in the solids in the trough, by retarding the shaft 25 the plows may be caused to travel at a different angular velocity and mechanically lift or skim the solids from the peripheral opening 12a with a minimum amount of solids attrition and apparatus erosion. In this manner any desired rate of flow of catalyst can be obtained by varying the differential angular velocity of the plows 22 and the rotatable chamber or turbine 10. If desired, a plurality of independent skimming units similar to those described, but individually of lesser diameter than chamber 10, can be used.

As the material is dislodged from the trough 16 of the rapidly rotating chamber 10 by means of the slower rotating plows 22, it falls into the hopper 27 of the pump wherein its is instantly deaerate and thence is transferred therefrom by outlet 17. Suitable aeration of the accumulated solids within the hopper 27 of the pump casing 15 can be effected by an aeration gas introduced by line 28. The pump housing 15 is maintained under pressure and pressuring fluids may be introduced by a line 37 or a pressure equalizing line may communicate between the pump housing 15 and the zone into which the catalyst is to be introduced via outlet 17.

The relative velocity of the plows 22 and the chamber 10 can be controlled manually by a shaft extending from the brake 30 to a point outside the hopper 27 or automatically by the float 29, linkage 31, and brake 30 about shaft 25. The position of the float is determined by the level or quantity of the aerated solids within the hopper 27 of the pump and the transfer of solids from the low pressure zone into a high pressure zone is thus controlled by the amount of solids accumulated within the pump. The rate of solids transfer through the turbine is determined by the depth of cut made by the plows and by the differential angular velocity between the turbine 10 and the plow assembly.

It is also contemplated that each of the plows 22 can comprise a freely rotatable disc. The discs can be plain or dished and set at a small angle to the plane of rotation of chamber 10. The mounting 23 can be fixed relative to the chamber 10 and the differential peripheral speeds of the rotatable disc plows and of the chamber 10 will be small. When employing discs to engage and remove solids from trough 16 they need not be carried on spider 23 but can be fixed to housing 15 and made adjustable with respect to the depth of entry into trough 16. As shown in Figure 4, the disc 32 is rotatably fixed to adjustable support 33 carried by pivot 34, screw 35 and handle 36 being provided to make the adjustment.

The structure as described is adaptable for use in a variety of operations but is particularly suitable for use in hydrocarbon conversions in the presence of finely divided or granular catalyst material such as an activated clay or synthetic silica-alumina. In such a process large volumes of catalyst are supplied to the system in a continuous manner and at a rate sufficient to maintain the desired ratio between the volume of catalyst and the quantity of hydrocarbons. The apparatus is also well adapted to transfer of powdered iron, cobalt and similar catalysts employed in the synthol process for conversion of carbon monoxide into hydrocarbons. As described, the apparatus contemplated provides a means by which the transfer rate of finely divided solids can be maintained within desired limits while preventing premature contact with the solids or pressure loss by blow-back. In general, the objects of my invention have been attained by the method and means described hereinabove.

One important advantage of my fluidized solid pump is the large increase in pressure attainable in a single stage, substantially without erosion of the apparatus. This is accomplished by making the rate of solids transfer independent of the rate of rotation of the turbine. The turbine may suitably be driven at a speed of 200 to 500 R. P. M. although higher speeds can be used where needed to maintain the pressure differential. Thus speeds of 800 to 1500 R. P. M. are frequently required and speeds of 2000 to 5000 R. P. M. are contemplated. A test run at 1000 R. P. M. showed a compaction of powdered siliceous catalyst sufficient to prevent flow through an obstructed orifice. When the obstruction was removed by removing a part of the catalyst outside the orifice, flow was reestablished at that speed.

The character of flow occurring in the compact mass is not true fluid flow since it can occur only in one direction under the influence of gravity or centrifugal force. It may more properly be called "creep" and will so be referred to herein.

When desired to increase the pressure beyond the amount conveniently obtainable in a single stage, two pumps can be arranged in series, one delivering fluidized solids into the other. Dual stage pumps with a plurality of turbines on a single shaft can readily be constructed. Each stage may raise the pressure by 10 to 100 p. s. i. giving any desired overall pressure without the use of extreme rotational speeds on the turbines.

In operation, deaeration of the solids suspension within the bowl of the turbine 10, resulting from the action of centrifugal force, liberates part of the gas in which the solids were suspended when introduced into the turbine and compresses the remainder. The liberated gas escapes from the bowl by passing upward around the stationary induction pipe 14a and within the rotatable conduit 14.

The density of the fluid catalyst suspension introduced at low pressure may be about 10 to 40 lbs. per cubic foot in the case of siliceous catalysts used in petroleum refining processes, such as the silica-alumina catalysts, clays, fuller's earth, etc. Catalysts used in desulfurizing, decolorizing, cracking, reforming, hydroforming and similar processes, comprised chiefly of alumina, silica, magnesia, and mixtures thereof usually have bulk densities when fluidized in the range of 15 to 30 lbs. per cubic foot in dense phase suspension.

In handling oxides of the heavy metals such as iron oxide, zinc oxide, cobalt oxides and the catalysts used in hydrogenation reactions and the synthol process, greater densities are usually encountered, for example, 50 to 125 lbs. per cubic foot for the dense fluid suspension.

In the centrifugal turbine bowl, the deaerated catalyst accumulating therein will have a density greater than that of the settled catalyst powder resulting from gravity settling. In the case of siliceous and aluminiferous catalysts used in petroleum refining, the packed density in the bowl is usually about 60 to 120 lbs. per cubic foot, 65 to 85 lbs. per cubic foot being typical of a silica-alumina powdered cracking catalyst. Higher densities obtained in this way by packing increase the pressure differential obtainable by my powdered solid transfer apparatus over those obtainable with unpacked catalyst.

The apparatus illustrated in Figures 1, 2 and 3 has the trough 16 at the periphery of the turbine 10 made as an integral part of one side of the turbine but it can be a separate channel 38 attached to the turbine 10 but accessible from both sides as shown in section in Figure 5.

Various modifications can be made in the apparatus or the operation thereof by those skilled in the art without departing from the spirit of the invention. Thus, the turbine may be simply a rotating, balanced pipe in which a column of compacted solids is trapped at the outer end by a body of solids held in place by centrifugal force. Mechanical removal of the solids from this body will establish and control the flow through the rotating column. This improvement and modifications thereof are described and claimed in my copending continuation-in-part application S. N. 622,229 filed October 13, 1945. It is not intended that the invention is to be limited to any specific features since the disclosure made herein is for the purpose of illustration, the scope of the invention being defined by the appended claims.

I claim:

1. In a centrifugal pump for finely divided solids, which includes a casing and a rotatable chamber within said casing having a constricted opening at its periphery, the improvement which comprises a trough forming a part of said chamber and disposed adjacent to the constricted opening therein and adapted to receive solids from said opening, rotatable skimming means extending into said trough and means for controlling the differential angular velocity of said skimming means and said chamber.

2. A centrifugal pump for finely divided solids, comprising a casing, a rotatable chamber within sad casing havng a constricted openng at its periphery, a trough surrounding said chamber and in alignment with said opening, skimming means to skim solids from said trough and means for causing said skimming means to rotate in the direction of rotation of said chamber at a lower angular velocity than said chamber.

3. In an apparatus for transferring finely divided solids including a transfer case, a rotatable hollow shaft passing into said case, a rotatable chamber fixed to said shaft within the case having a constricted peripheral opening, and means for removing solids through said constricted peripheral opening, the improvement which comprises a plurality of baffles within said chamber adapted to guide solids to the peripheral opening, an inwardly extending peripheral flange on said chamber defining a trough disposed adjacent to the peripheral opening in said chamber and adapted to accumulate solids passing through the opening, and rotatable means mounted adjacent said chamber extending into the trough.

4. In an apparatus for transferring finely divided solids including a pump chamber, a hollow shaft passing vertically downward into said pump chamber, a rotatable chamber depending from said shaft within the pump chamber communicating interiorly with said shaft and having a constricted opening at its periphery and means for removing solids accumulated at said periphery, the improvement which comprises a plurality of internal and radially extending baffles within said rotatable chamber; a trough at said periphery surrounding said chamber and forming a part thereof disposed adjacent to said peripheral opening, support means mounted below said rotatable chamber on a floating rotatable shaft coaxial with said hollow shaft, scraper means carried by said support means and extending into the trough, means whereby said support means and said scraper means are rotated at substantially the same angular velocity as said rotatable chamber, and means structurally arranged within the pump chamber and associated with said floating shaft for retarding the rotation of said scraper means whereby the trough and the scraper means are rotated at different angular velocities.

5. In a centrifugal solids pump, a rotatable chamber, conduit means for introducing fluidized solids into said chamber, an outlet at the periphery of said chamber, an annular trough surrounding the periphery of the chamber and forming a part thereof adapted to receive solids from said chamber, said trough being of sufficient depth to accumulate the solids therein during the rotation of the chamber, skimming means extending into said trough and adapted to remove solids therefrom, said skimming means being rotatable in substantially the plane of rotation of said chamber, and means whereby said skimming means is rotated at a different angular velocity from that of said chamber.

6. In a centrifugal solids pump, a rotatable chamber, inlet means for introducing fluidized solids into said chamber, a peripheral annular outlet for said solids, a trough surrounding the periphery of the chamber and forming a part thereof adapted to receive solids from said outlet, said trough being of sufficient depth to accumulate solids therein during the rotation of the chamber, and plow means extending into said trough and adapted to remove solids therefrom, said plow means being rotatable in substantially the plane of rotation of said chamber, means whereby said plow means is rotated at a different angular velocity from that of said chamber and said trough whereby the peripheral velocity of said plow means is less than the peripheral velocity of the said trough.

7. The process of transferring finely divided solids from a zone of relatively low pressure to a zone of higher pressure which comprises aerating said solids with a gas to produce a dense fluid suspension, supplying said aerated solids into a centrifugal separating zone, subjecting the suspension to centrifugal force whereby a mass of substantially immobile deaerated solids is accumulated in an annular zone surrounding said centrifugal separation zone, maintaining a pressure seal between said centrifugal separation zone and said zone of higher pressure by means of said immobile mass of accumulated solids, maintaining said accumulated solids exposed to said higher pressure zone in rotation and transferring solids into said higher pressure zone by cutting a longitudinal section of solids from said mass at a linear velocity substantially less than the peripheral velocity of the mass of the accumulated solids while in rotation.

8. The process of transferring finely divided solids from a zone of relatively low pressure to a zone of higher pressure which comprises fluidizing said solids in a gas to produce a dense free-flowing suspension, conducting said suspension of solids substantially without change in pressure into a circular zone of rotation provided with an annular restricted opening at the periphery, said rotational zone being enclosed within said zone of higher pressure, rotating said suspension within said rotational zone at sufficient velocity to deaerate and compact said solids into an immobile mass within said restricted opening, preventing the creep of solids through said opening by maintaining an annular elongated pool of compacted solids external of said opening and in supporting contact with the solids therein, said pool and the compacted solids within said opening being integrally disposed to rotate at the same speed and effecting the transfer of solids through said opening and through said pool into said zone of higher pressure by cutting a longitudinal section of solids from said pool at a linear velocity substantially less than the peripheral velocity of the solids in said pool while in rotation.

9. The process of claim 8 wherein the rate of flow of solids into said zone of higher pressure is controlled by regulating the rate of cutting said compacted solids from said pool.

10. The process of claim 8 wherein the rate of flow of solids into said zone of higher pressure is controlled by regulating the depth of cutting said compacted solids from said pool.

11. A fluidized solids pump comprising a housing, an outlet for solids at a low point therein, a rotatable hollow impeller member within said housing at an upper part thereof, a hollow shaft extending through the wall of said housing and connecting with said impeller member, conduit means within said shaft communicating with the interior of said impeller member for supplying solids thereto, an opening at the periphery of said impeller member, a peripheral trough forming a part of and surrounding said impeller member adapted to receive solids passing through the peripheral opening of said impeller member and to accumulate said solids therein and controllable means extending within said trough for rotating with said impeller means at a different angular velocity than said impeller means whereby compacted solids are continuously removed from said trough.

12. The process of transferring finely divided solids from a zone of low pressure to a zone of higher pressure which comprises fluidizing said solids within said zone of low pressure by suspending them in an aerating gas sufficient to provide a dense suspension, deaerating said suspension in a confined centrifuge zone and accumulating the solids in a compacted mass at the periphery of said centrifuge zone, restraining the flow of said solids from said centrifuge zone by an obstructing second mass of said solids held in communication therewith at the periphery of said centrifuge zone, separately withdrawing aeration gas from said centrifuge zone, withdrawing solids from said second mass in a substantially radially inward direction, and dispersing the withdrawn solids within said zone of higher pressure.

13. In a centrifugal pump for finely divided solids, including a pump casing and a rotatable chamber within said casing having a constricted peripheral opening therein, the improvement which comprises a trough forming a part of said chamber and disposed adjacent the peripheral opening, rotatable scraper means within said casing and extending into said trough to engage solids therein, whereby said scraper means normally rotates at the same angular velocity as said chamber, means for retarding the speed of rotation of said scraper means whereby a different angular velocity is obtained than that of said chamber, and means responsive to the quantity of solids within said housing for controlling said rotation retarding means.

14. In a pump for conveying suspended solid particles from a low pressure zone to a zone of higher pressure, the combination of a casing, a rotatable chamber within said casing, said chamber having an inlet for communication with a low pressure zone and a constricted peripheral opening communicating with said chamber, means within said casing surrounding said chamber and disposed adjacent the peripheral opening normally adapted to rotate with said chamber and to receive and accumulate solids from the opening, rotatable scraper means adapted to engage the accumulated solids and to rotate at a different angular velocity from that of said chamber, and an outlet for said casing communicating with the higher pressure zone.

15. The combination of claim 14 including means within said casing adapted to alter the differential angular velocity of said chamber and said scraper means in response to a variation of solids which accumulate in said casing.

16. In the combination of claim 14, means in said inlet to said chamber and said outlet for said casing for aerating solids therein.

VANDERVEER VOORHEES.

REFERENCES CITED

The following references are of record in the file of this patent:

UNITED STATES PATENTS

| Number | Name | Date |
|---|---|---|
| 1,937,040 | Vogel-Jorgensen | Nov. 28, 1933 |
| 2,360,464 | Arveson | Oct. 17, 1944 |